Patented Mar. 6, 1956

2,737,514

SALTS OF SUBSTITUTED PTERIDINES AND METHOD OF PREPARING THE SAME

Barbara Roth, Middlesex, N. J., assignor to American Cyanamid Company, New York, N. Y., a corporation of Maine No Drawing. Application June 30, 1951,
Serial No. 234,669

6 Claims. (Cl. 260—251.5)

This invention relates to new organic compounds. More particularly, it relates to acid addition salts of tetrahydroformylpteroyl amino acids and a method of preparing the same.

The compounds of the present invention are acid salts of substances having the properties of a new vitamin, which is active in promoting the growth of the organism *Leuconostoc citrovorum,* which promotes the growth of chicks, rats, mice and which exerts a hemapoietic action in certain types of anemias in humans. It also has the property of reversing the toxicity of pteroylglutamic acid antagonists in bacteria, animals and humans.

In the past it has been reported that the treatment of naturally occurring citrovorum factor at an acid pH destroys the activity for *Leuconostoc citrovorum* and retains the pteroylglutamic acid-like property of stimulating the growth of *S. faecalis* R. (Broquist, Stokstad and Jukes, Journal of Biological Chemistry 185, 405 (1950)). Other products having similar properties which may or may not be identical in structure with the natural occurring citrovorum factor were described by the inventor and co-workers in Journal of American Chemical Society 72, 4325 (1950).

I have discovered that under certain conditions the vitamin can be precipitated with strong acids to yield new acid addition salts which are stable when dry and retain full biological potency both in promoting the growth of *Leuconostoc citrovorum* and in reversing competitively the toxicity of 4-aminopteroylglutamic acid for micro-organisms and animals. It is surprising, in view of the prior art, to find that stable and fully active acid salts of the new vitamin can be obtained.

It is a further object of the present invention to use the new salts to increase the purity of crude or partially purified preparations by precipitating such acid salts of the new vitamin and thus serve as a convenient means of concentrating the active material.

The type of acid addition salts obtained, for example, from aqueous solution appears to depend upon the solubility of the resulting salt. If the salt is relatively insoluble in water, such as in the case of the nitrate or oxalate, it is stable in form. If, however, the acid salt is quite soluble or if the solution is very dilute, then the acid salt remains in solution and on standing tends to change in chemical structure. The nature of this change is not fully understood but it is believed to be an intramolecular rearrangement to give a form of the vitamin which has decreased activity for *Leuconostoc citrovorum* but retains certain similarities to pteroylglutamic acid in biological action. In any event, such rearranged anionic salts can be differentiated from the acid addition salts of the present invention by their chemical properties, polarographic behavior, spectrophotometric properties and biological activity. It is also possible to obtain acid salts of the rearranged type by slow precipitation, for example, from aqueous solutions in 0.5 N hydrochloric acid. Salts of this type are described and claimed in a copending application, Serial Number 234,668, filed June 30, 1951, of which I am a co-inventor.

The new fully active acid addition salts of the vitamin which form the subject of the present application are prepared, for example, by the addition of a large excess of acid to a concentrated aqueous solution of the vitamin in the form of its free acid or as a cationic salt thereof. While water is the preferred solvent for this reaction, other strongly polar organic solvents or mixtures with water may be used. This reaction is preferably carried out at a temperature of from about 0° C. to about 25° C. The desired acid salt precipitates immediately as a crystalline mass which can be filtered, washed with an excess of acid and an organic solvent such as alcohol or ether and dried. The product is obtained as a white solid which is stable when protected from moisture. The salts are fully active in the biological test with *Leuconostoc citrovorum* and also in reversing 4-aminopteroylglutamic acid in micro-organisms and in higher animals.

In using the compounds of the present invention therapeutically it is usually desirable to convert the acid salt to one of its cationic salts, such as the sodium or calcium salts. By dissolving the acid salt in dilute aqueous alkali, adjusting to a pH 7–7.5, adding a substance capable of furnishing calcium ions and precipitating the calcium salt by the addition of an excess of alcohol or by concentration of the solution the calcium salts may be isolated in pure, stable form.

The structure of the compounds of the present invention may be represented as the acid addition salts of 5-formyl-5,6,7,8-tetrahydropteroylamino acids.

The following specific examples illustrate the preparation of slightly soluble acid addition salts of tetrahydroformylpteroylamino acids. These examples are by way of illustration and not limitation of the present invention.

Example 1

One part of a calcium salt of a tetrahydroformylpteroylglutamic acid containing $4.8 \times 10^6$ Sauberlich units/mg. is dissolved in 5 parts of water, followed by the addition of 25 parts of 5 N nitric acid. A white precipitate is formed, which is filtered off and dried; weight 0.73 part. This product has a biological assay of $6.67 \times 10^6$ Sauberlich units/mg. for *Leuconostoc citrovorum.*

Example 2

Two parts of a barium salt of a tetrahydroformylpteroylglutamic acid containing $3.67 \times 10^6$ Sauberlich units/mg. are dissolved in 10 parts of water, followed by the addition of 50 parts of 5 N nitric acid. A white precipitate is formed, which is filtered, washed with dilute nitric acid, alcohol, and acetone, and dried in the vacuum desiccator. The product, which weighs 1.43 parts, is white, and has increased activity for the test organism. Colored impurities remain in the nitric acid solution.

Example 3

1.28 parts of the calcium salt of a tetrahydroformylpteroylglutamic acid containing $3.36 \times 10^6$ Sauberlich units/mg. are dissolved in 6.5 parts of water, followed by the addition of 30 parts of 5 N nitric acid. A white precipitate is formed, which is filtered off, washed with dilute nitric acid, alcohol and acetone, and dried; weight 0.61 part of white product. This is then dissolved in 5 parts of 1 N sodium hydroxide and neutralized to pH 7. 0.15 part of calcium chloride in 30% solution are added, followed by 25 parts of 99% alcohol. A white precipitate is formed, which is cooled, filtered, washed well with alcohol and vacuum dried; weight 0.54 part. By assay with *Leuconostoc citrovorum* this calcium salt is essentially pure and this is confirmed by polarographic assay.

Example 4

0.1 part of a crystalline tetrahydroformylpteroylglutamic acid (6.67 × 10$^6$ Sauberlich units/mg.) is slurried in 1 part of water and ammonia added to dissolve it. Then 3 parts of a 20% oxalic acid solution in water are added. A product starts to precipitate, redissolves and a white precipitate of the oxalate salt of formyltetrahydropteroylglutamic acid precipitates. This is filtered and washed well with alcohol, followed by vacuum drying. It is fully active for the test organism.

I claim:

1. A method of purifying calcium formyltetrahydropteroylglutamate which comprises mixing said calcium salt with nitric acid to produce the nitrate addition salt thereof, subsequently reacting said nitrate salt with a calcium compound and recovering said calcium formyltetrahydropteroylglutamic acid therefrom.

2. A method of purifying alkaline earth metal salts of formyltetrahydropteroylglutamic acid which comprises mixing said compounds with nitric acid to produce the nitrate salt thereof, subsequently reacting said nitrate salt with an alkaline earth metal salt-forming compound and recovering said alkaline earth metal salt of formyltetrahydropteroylglutamic acid therefrom.

3. A compound of the group consisting of the nitrate and oxalate salts of 5-formyl-5,6,7,8-tetrahydropteroylglutamic acid and adjacent dicarboxylic amino acid homologues thereof.

4. The nitrate salt of 5-formyl-5,6,7,8-tetrahydropteroylglutamic acid.

5. The oxalate salt of 5-formyl-5,6,7,8-tetrahydropteroylglutamic acid.

6. A method of purifying alkali metal and alkaline earth metal salts of 5-formyl-5,6,7,8-tetrahydropteroylglutamic acid which comprises mixing said compounds with an acid of the group consisting of nitric and oxalic acids to produce the corresponding acid addition salts thereof, subsequently reacting said addition salts with a member of the group consisting of alkali metal and alkaline earth metal salt-forming compounds and recovering said alkali metal and alkaline earth metal salts therefrom.

References Cited in the file of this patent

UNITED STATES PATENTS

| | | |
|---|---|---|
| 2,457,375 | Hutchings | Dec. 28, 1948 |
| 2,474,134 | Kuh et al. | June 21, 1949 |
| 2,487,668 | Pasternack et al. | Nov. 8, 1949 |
| 2,545,305 | O'Dell | Mar. 13, 1951 |
| 2,594,271 | Fahrenbach | Apr. 29, 1952 |